Figure 1:
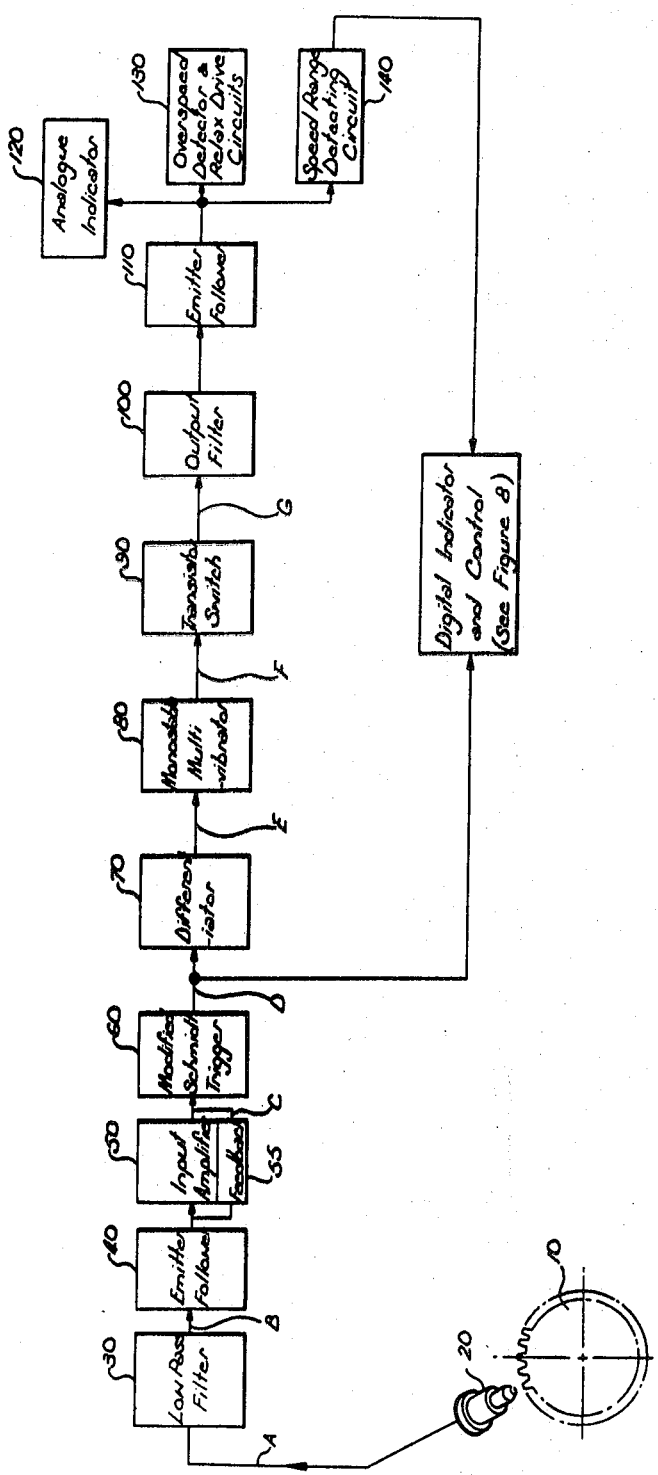

United States Patent [19]
Cass

[11] 3,832,635
[45] Aug. 27, 1974

[54] COMBINED DIGITAL-ANALOGUE SPEEDOMETER

[75] Inventor: George Robert Cass, Montreal, Quebec, Canada

[73] Assignee: Canadian National Railway Company, Montreal, Quebec, Canada

[22] Filed: Jan. 7, 1972

[21] Appl. No.: 215,999

[52] U.S. Cl.............................. 324/166, 324/174
[51] Int. Cl. .......................................... G01p 3/56
[58] Field of Search .......... 324/166, 168, 171, 173, 324/174, 175, 78 D, 79 D; 235/92 T, 92 TF; 340/263

[56] References Cited
UNITED STATES PATENTS
| | | | |
|---|---|---|---|
| 3,267,372 | 8/1966 | Fritzsche............................ | 324/166 |
| 3,525,044 | 8/1970 | Richmond........................... | 324/173 |
| 3,614,615 | 10/1971 | Cass.................................... | 324/174 |

OTHER PUBLICATIONS
Hewlett–Packard Journal–pub. Hewlett–Packard Co.–V. 18, N. 8 – April, 1967, pp. 2–7.

Primary Examiner—Michael J. Lynch
Attorney, Agent, or Firm—Larson, Taylor & Hinds

[57] ABSTRACT

The rotation of a railway vehicle wheel is used to supply a periodically varying signal. The periodically varying signal is used to (a) generate a series of pulses of constant amplitude and duration and proportional in frequency to the periodically varying signal which constant amplitude duration pulses are subjected to an integrationtype operation to produce an analogue indication of the railway vehicle speed; and (b) generate pulses of frequency proportional to that of the periodically varying signal, which may be counted and displayed over a sampling period to provide a digital indication of the railway vehicle speed. With the digital indication a scale switching arrangement is provided so that the indicated speed units are larger at low than at high speeds. Provision in the system is made so that switching from low speed to high speed scale takes place at a higher speed than from high speed to low speed scale to reduce the frequency of scale switching.

5 Claims, 8 Drawing Figures

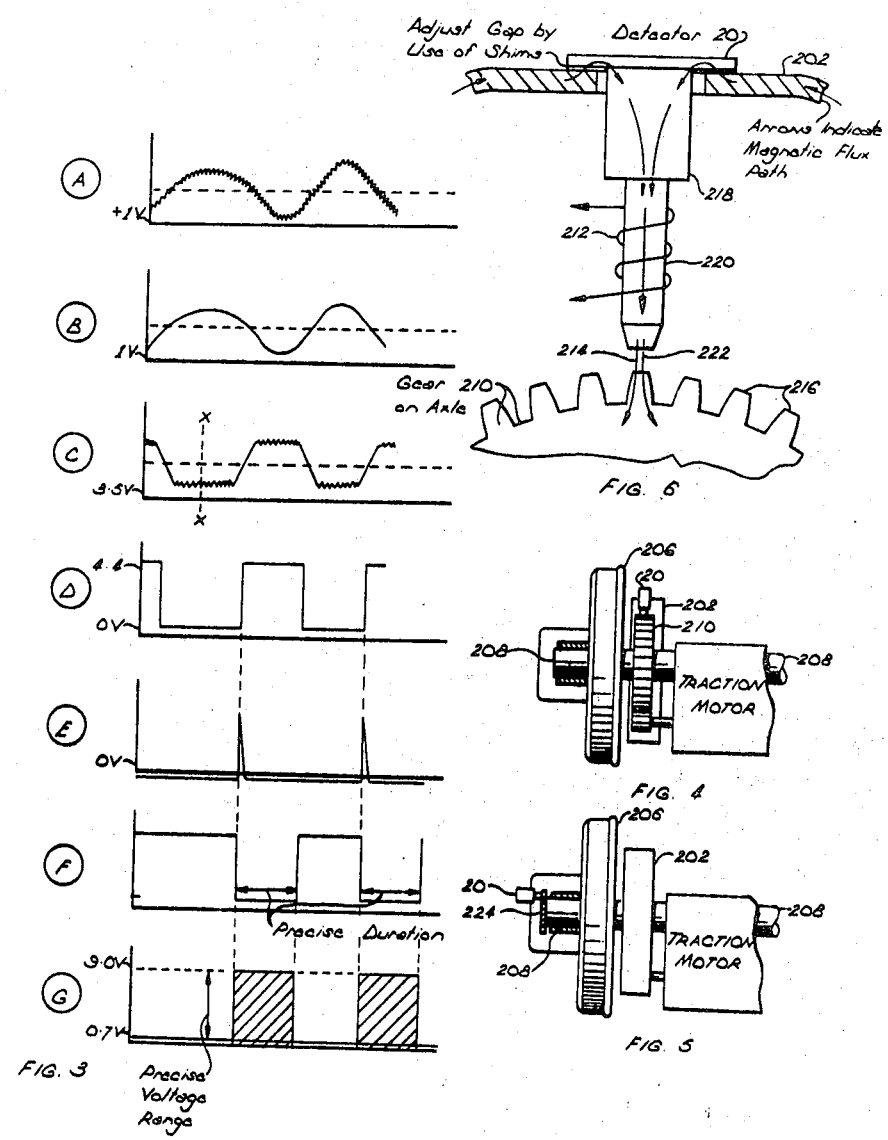

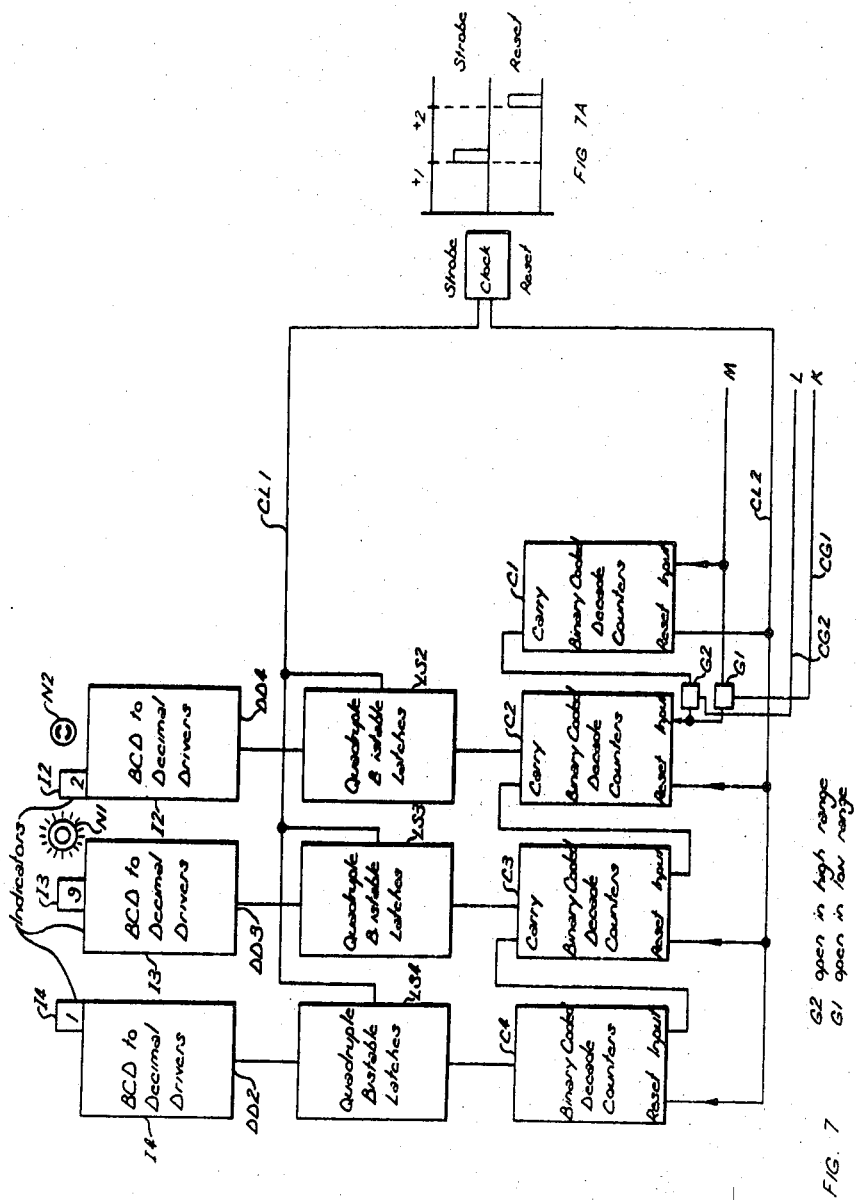

COMBINED DIGITAL-ANALOGUE SPEEDOMETER

This invention relates to a speedometer for railway vehicles. The speedometer will, in almost all cases, be mounted in the locomotive but could be mounted in another railway vehicle.

It is an object of the invention to provide a system of speed determination suitable for the use of electronics and/or solid state means.

It is an object of one aspect of this invention to derive, by electronic circuitry, an indication of railway vehicle speed from a cyclically varying signal whose frequency varies as the rotational speed of the railway vehicle.

It is an object of one aspect of the invention to derive an indication of railway vehicle speed as mentioned in the previous paragraph wherein these is derived from the cyclically varying signal, a series of pulses having the same time X magnitude 'area' or product and a frequency proportional to that of said cyclically varying signal, and where the speed indication is an analogue one.

It is an object of one aspect of the invention to derive an indication of railway vehicle speed by deriving a periodically varying signal of a frequency proportional to the rotational speed of a shaft of such vehicle, counting the cycles of said periodically varying signal in a predetermined interval, and providing a digital indication of speed based on the count during said interval.

It is a preferred object of the invention, described in the previous paragraph, to perform said counting on a plurality of cascaded ascending decade counters, and where said interval is selected so that the count on said counter at the end of such interval is, other than the decimal point, in numerical correspondence to the vehicle speed and where means are provided for displaying the count obtained in an interval.

It is a preferred object of one aspect of the invention, described in the previous paragraphs, to provide for displaying the speed in one set of units when a counter is connectible as the lowest order counter in said cascade is not so connected; and where said counter is arranged to display the speed in units ten times as large when said counter is so connected; and wherein for speeds increasing to over a first predetermined value the display is switched to the higher unit range and for speeds decreasing to less than a second predetermined value the display is switched to the lower unit range. Preferably said first predetermined value is higher than said second predetermined value to reduce range switching in the display at speeds in the vicinity of the range change values.

Figure 2:
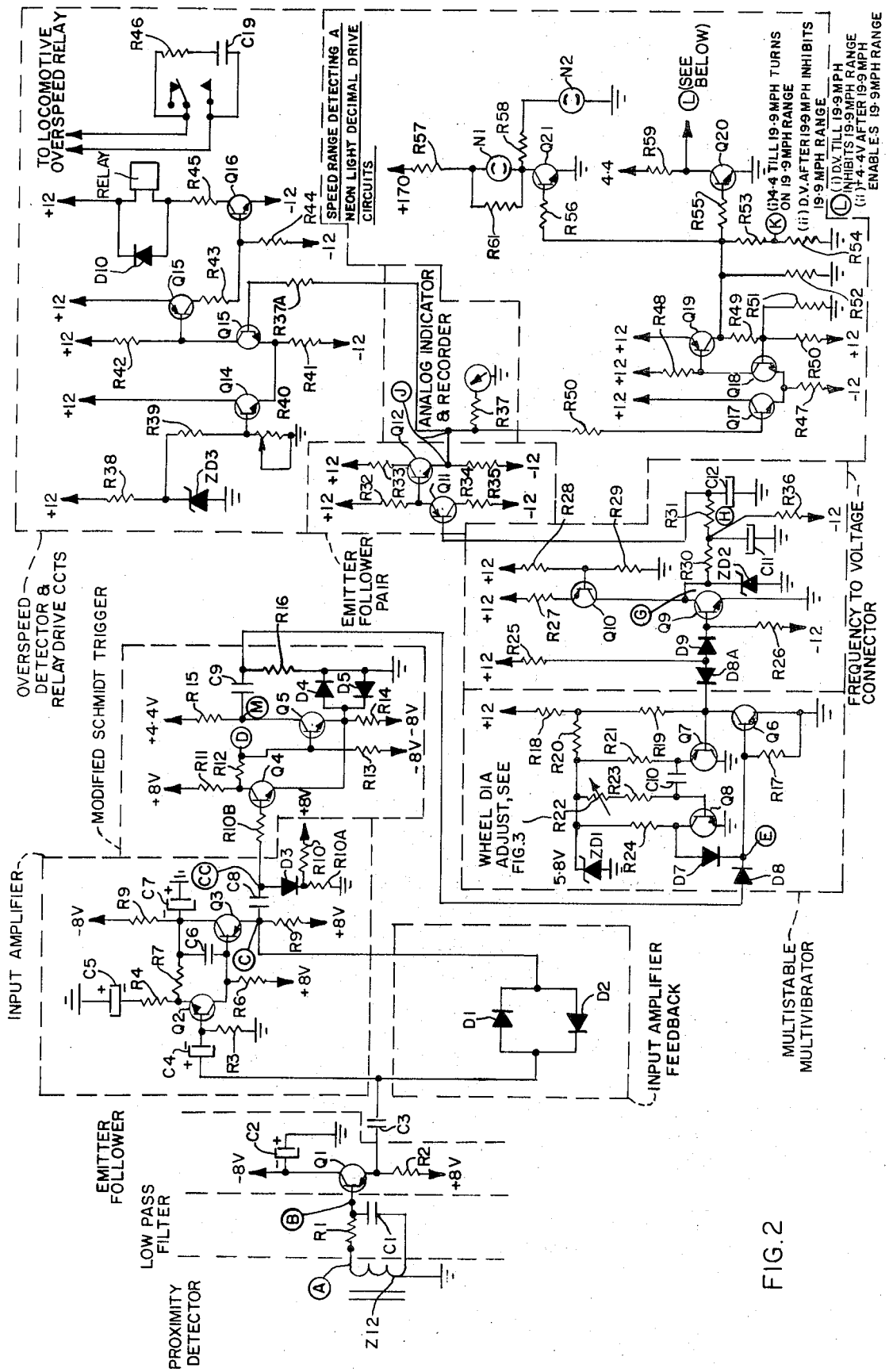

In drawings which illustrate a preferred embodiment of the invention:

FIG. 1 is a block diagram of the circuitry for carrying out the invention,

FIG. 2 shows a detail of the circuitry for carrying out the invention excluding the power supply and the digital counter and display circuitry, FIG. 3 is a number of graphs at various parts of the circuitry of FIG. 2, FIG. 4 and FIG. 5 show methods of mounting the proximity detector, FIG. 6 shows a portion of the magnetic circuit of the proximity detector as shown in FIG. 4, FIG. 7 shows a detailed diagram of the digital counter and display circuitry.

FIG. 7a shows a diagram of the output of the clock of FIG. 7.

FIG. 1 shows a block diagram of the circuitry of the invention and FIG. 3 indicates the shapes of some of the signals produced therein. In FIG. 1 is schematically indicated a toothed disc or gear 10 which would be attached to a railway vehicle shaft for rotation therewith and a proximity detector 20 for deriving a cyclically varying signal from said toothed member and supplying such cyclically varying signal A to a frequency to voltage converter circuit, the frequency being determined by the number of teeth and the speed of rotation of the vehicle shaft.

The output of the proximity detector 20 which is, with complicating factors to be explained hereafter, basically a signal having a frequency proportional to drive axle speed, is shaped and used in the blocks of circuitry shown in FIG. 1 and in detail in FIG. 2 producing two alternative types of output, both of which are shown, although either may be used alone. In one output case there is produced, a signal whose voltage is proportional to the frequency of the cyclically varying signal obtained by the proximity detector, which voltage is used to produce an analogue indication of railway vehicle speed. In the other case there is produced a periodically varying signal whose frequency is proportional to the speed of rotation of the railway vehicle shaft. A counter is designed to measure the number of cycles of such periodically varying signal during a predetermined interval of time and the count thus obtained is used to provide a digital indication of railway vehicle speed.

The frequency to voltage indicator comprises: a low pass filter 30 for eliminating unwanted high frequency components superimposed upon the proximity detector signal; having an output B, an emitter follower stage 40 presenting a high impedance to the signal from the proximity detector to avoid the loading of the latter. The output of the emitter follower 40 is fed to an input amplifier 50 which amplifies the signal and whose performance is affected by a feedback circuit 55 and which produces an output C. The output of the amplifier is connected to a modified Schmitt Trigger 60 where the frequency proportional to axial speed is used to generate square waves D preferably the same frequency.

The output of the Schmitt Trigger 60 is differentiated and the positive pulses E are used for analogue speed determination to trigger a special monostable multivibrator 80 which provides, in response to each positive pulse, pulses F of fixed duration determined by the specialized design of the multivibrator 80. The pulses from the multivibrator are supplied to specialized transistor switch circuitry 90 wherein there are produced pulses G all of substantially the same duration determined by multivibrator 80 and all of substantially equal height. Such 'constant area' or constant magnitude X time pulses G which, in number, vary as axle speed, are then supplied to an output filter which produces, from such pulses, a voltage whose magnitude varies as axle speed. Such voltage is used to provide an analogue indication of railway vehicle speed. The output of the modified Schmitt Trigger 60 being a square wave signal, is applied to a digital counter and indicator which is designed to cyclically count over an interval of predetermined duration, then reset and to count again over an interval of substantially the same length. The count obtained in such interval is used to provide a digital indication of the speed of the vehicle whose shaft rotation is being measured. Preferably the count is made on cascaded decimally ascending counters, and the interval is selected so that the count at the end of an interval, will (except for the decimal position) numerically represent the speed of the railway vehicle. If desired and, as shown in the preferred embodiment, the digital indication by including or bypassing the lowest decade counter, may be made to represent one of two decimally separated ranges.

Before entering into the discussion of specific circuitry, it should be noted that the description and the drawings will, from time to time, indicate that a particular voltage or polarity D.C. supply is called for. This is for guidance only however, and it will be realized that by altering the values of the circuit in accord with techniques well known to those skilled in the art, different D.C. supply voltage polarities or values may be used. Regulated supplies are indicated by a dot beside the voltage value.

PROXIMITY DETECTOR

The proximity detector provides a signal A including pulses of frequency varying the axle speed. FIG. 4 shows the detector 20 mounted on the gear case 202 enclosing the shaft drive gear 210 of a locomotive (the detector may be associated with the wheel shaft or any member rotating at a speed of such wheel shaft; and the wheel shaft or member may be on any railway vehicle whose speed is to be measured). As shown in FIG. 6 the detector comprises a permanent magnet 218 from which projects a soft iron core 220 towards and (through the gear case 202) into close proximity to the teeth 216 of gear 210. The magnetic air gap between the tip 214 of core 220 and teeth may be adjusted by shims (not shown) between detector 20 and gear case 202 (or may be adjusted in any of a number of manners well known to those skilled in the art). Surrounding the core 220 is the coil 212 of the proximity detector. A magnetic circuit is formed from the magnet 218 through the core 220 across the detector sensing tip 214, across the air gap 222 (preferably about 1/4 inch) to the gear teeth 216, through the drive axle 203 and back through the gear case 202 to the magnet 218. Movement of the gear teeth 216 varies the effective width of gap 222 opposite sensing tip 214 and thus the magnetic flux passing through coil 212 varies because the reluctance of the magnetic path changes. This induces a voltage in coil 212, proportional to the number of turns, and the rate of change of flux with time through the coil. Thus the voltage varies at a frequency determined by the speed of rotation of the drive axle to which the gear 210 is attached. The voltage is roughly sinusoidal in form (see A in FIG. 3). A large number of factors can cause unwanted high and low frequency fluctuations to be superimposed upon the rough sinusoid. Axle slide play and perhaps other factors can cause a low frequency or a D.C. drift (as well as high frequency fluctuations) to be superimposed upon the rough sinusoid.

In the embodiment of FIG. 5, the drive gear is not used to supply the gap fluctuations. Instead a toothed disk 224 of soft magnetic material is mounted on and adjacent shaft 208 and the proximity detector 20 has its core and sensing tip directed parallel to shaft 208 but aligned and in proximity with the teeth and interposed spaces. It will be seen that the operation of the magnetic circuit and the mode of producing a roughly sinusoidal wave is otherwise similar to that described in connection with FIGS. 4 and 6.

In the detailed description to follow, positive and negative D.C. supplies are indicated by positive and negative voltage values. These are so designated to give some idea of order of magnitude and relative values to aid in the understanding and explanation of the circuitry. The invention is not intended to be limited to the values suggested.

LOW PASS FILTER

The coil 212 of the proximity detector is connected (see FIG. 2) at one end to ground while the other end is connected through a resistance R1 to the base of a transistor Q1. The connection between R1 and Q1 is connected to ground through a capacitor C1. The resistance R1 and capacitor C1 form a low pass filter to pass the frequency proportional to axle speed but to eliminate unwanted high frequency components from the signal A and to present to the input of transistor Q1 the roughly sinusoidal signal (graph B)

EMITTER FOLLOWER

The emitter of transistor Q1 is connected to +8 volts D.C. through resistor R2 and the collector of transistor Q1 is connected to negative −8 volts D.C. Supply and also through an electrolytic capacitor C2 to ground. The capacitor C2 acts as a high frequency ground. The emitter follower has its output connected between R2 and the emitter of Q1. The emitter follower acts as a high impedance load to the output of the proximity detector and input filter and avoids "loading" of the proximity detector coil 212.

INPUT AMPLIFIER

The emitter of transistor Q1 carrying the output signal is connected through capacitor C3 to the input amplifier stage which includes a special negative feedback connection which modifies the operation of the amplifier. Before discussing the operation and the detailed circuitry of the input amplifier, it is preferred to explain its overall operation and it will be seen that the output of the amplifier is connected to the input through a feedback line having in parallel semi-conductor diodes D1 and D2 being arranged in opposite polarity. The connection will be such that the feedback is negative, that is, whatever the design of the amplifier the feedback through the parallel semi-conductor diodes, will be such that the effect of the feedback circuit through the diode is to counteract the effect of the input signal. It is a well known fact that ordinary semiconductor diodes require, in the conducting direction, a definite voltage applied to them before conduction will occur, this being about 0.7 volts for silicon diodes and 0.2 volts for germanium diodes, and thus that (assuming silicon diodes are used) any deviation of the output from the input of more than 0.7 will cause feedback, through the diode poled to conduct such deviation, whereas deviations of less than this amount will not be fed back. If the amplification factor of the amplifier used is 20, then if the input signal is −0.030 volts the output is this amount times −20 giving an output 0.6 volts which will appear at the output but will not conduct through the diodes. If the input goes to −0.035 volts the amplifier output will tend to go to 0.7 volts but as this results in a drop of just greater than 0.7 volts across the diodes, D2 will conduct and will continue to conduct as the input goes more negative or as long as the difference between output and input is greater than +0.7 volts. During the conduction of D2 the signal fed back makes the input signal less negative. Thus when an inflection takes place in the input signal of from −0.035 volts to +0.035 volts during such inflection the output voltage will also swing, and about the time the input signal reaches +0.035 volts, D1 will conduct to counteract the positive swing and to limit the output to a range of just under ±0.7 volts — the output is shown as graph C. Since the diodes, when considered with the amplifier require only ±0.035 volts to conduct, inflections of this amount or greater in the input signal are detected. This seems an adequate sensitivity since the input to the amplifier stage may be designed to have a peak-to-peak variation of greater than 1 volt.

Before a detailed explanation is provided of the amplifier circuitry, which has its own specific advantages, it is pointed out that the advantages previously described are independent of the specific amplifier circuitry, and merely require an amplifier with a negative feedback line through parallel diodes of opposed polarity where the drop across the diodes in the conducting direction may be predetermined.

Dealing now specifically, with the amplifier circuitry, the output side of condenser C3 is connected between the input side of capacitor C4 and the output side of parallel opposed diodes D1 and D2. The output side of capacitor C4 is connected to the base of an NPN transistor Q2, with the base also being connected to ground through resistor R3. Transistor Q2 has its emitter connected to ground through resistance R4 and capacitor C5 in series, and its collector connected to +8 volt D.C. through resistor R6. The collector of Q2 is connected to the base of the next amplification stage being PNP transistor Q3 and the emitter of transistor Q2 is connected to the collector of Q3 through resistor R7 while the collector and base of Q3 are connected through capacitor C6. The emitter of transistor Q3 is connected to +8 volt D.C. through a resistor R8 and the collector is connected to −8 volt D.C. through a resistor R9 and also connected to ground through an electrolytic capacitor C7. The emitter of transistor Q3 is connected to the negative feedback line containing diodes D1 and D2 in parallel as previously discussed, and the emitter of transistor Q3 carries the output signal (C of FIG. 3) from the input amplifier. The emitter of transistor Q3 is connected through electrolytic capacitor C8 and a diode D3 in series to the junction between a pair of resistances R10 and R10A. Resistances R10 and R10A are connected in series between +8 volt D.C. and ground. The purpose of the circuitry comprising diode D3 and resistances R10 and R10A is to provide a limit to the downward excursion of the voltage at point CC which does not however, under normal operation, affect the wave shape as indicated in graph C.

R3 provides D.C. bias for transistor Q2. It is noted that the emitter of Q2 is returned through R7 and R9 to the −8V. supply to allow forward biasing of the Q2 base-emitter junction. The purpose of C4 is to act as a D.C. block and to alloy only A.C. signals to be applied to the base of transistor Q2. Thus the quiescent operating point of the emitter of transistor Q3 does not affect the voltage level of the base of Q2 to which it is connected through the diodes and C4, and only the changes in level of the Q3 emitter which are transmitted through the diodes reach the base of Q2 through C4.

In operation, the signal of the shape of graph B, is applied at the base of Q2. A signal going positive relative to the emitter of Q2 to increase conduction lowers the collector voltage of Q2 being the voltage of the base of Q3, increasing the conduction through Q3 and lowering the output voltage at C. A signal going negative at the base of Q2 has the opposite effect. In either event, the negative feedback line through D1 and D2 has the effect of limiting the output range to values where the difference between the output at point C and the input between C3 and C4 is never greater than 0.7 volts. The presence of the capacitor C5 tends to make the D.C. gain approach 1. At a limit determined by the characteristics of R4 and C5 (being the lower frequency level for which the amplifier is to be used) the capacitor C5 begins to act as an A.C. ground and the A.C. gain is limited by the values of R7+R4/R4 the ratio varying inversely as the negative feedback applied from the collector of Q3 to the emitter of Q2, and thus setting an upper limit for the A.C. gain.

Under temperature changes the individual values of R7 and R4 may vary but the resistances may be chosen so that the value of the ratio R7+R4/R4 remains substantially the same and hence good temperature stability is provided by the amplifier.

The capacitor C6 tends to act as a short circuit to frequencies above a certain level and therefore above such level acts as a negative feedback between the collector and base of Q3 thus setting the upper frequency limit for the amplifier operation.

The amplifier has a number of unique and advantageous features. Low output impedance is provided by the fact that the conduction and potentiometer setting of D3 is preferably set to take place when point CC attempts to go more negative than −0.5 volts. Thus the negative swing of the voltage is limited to the above value, (producing a voltage of the shape of graph C with its lowest swing at or just above −0.5 volts) and when such limiting occurs the positive plate of C8 will draw charging currents from the +8 volts emitter supply of Q3. Should this charging current be large enough to unduly reduce the current that runs through Q3, the charge on C7 provides a reservoir for the supply of current if this should happen.

The result is an amplifier allowing for large changes in current with small changes in output voltage and hence low output impedance.

Since the alternating current gain is controlled by the resistances R7 and R4, high temperature stability is achieved due to the temperature compensating features of the circuitry used.

Due to the low D.C. gain, D.C. drift will not be amplified and the amplifier provides high potential A.C. gain of which any percentage may be used depending on the value of R4 and R7 and a high band width which may have a lower cut-off frequency of 10 cycles per second, the band width, as previously explained, being determined at the upper limit by the value of capacitor C6 and at the lower limit by the value of R4 and C5.

MODIFIED SCHMITT TRIGGER

The output of capacitor C8 shaped as in graph C is connected through a resistance R10B to the input of the Scmitt Trigger and within the Schmitt Trigger to the base of an NPN transistor Q4. The collector of transistor Q4 is connected through a resistance R11 to +8 volts D.C. and through resistances R12 and R13 to −8 volts D.C. The +8 volts D.C. and the −8 volts D.C. connections connected through resistances R11, R12 and R13 in series provide that the base of Q5 will be at a predetermined potential level. The emitter of Q4 is connected to −8 volts D.C. through a resistor R14. The line between resistor R12 and R13 is connected to the base of an NPN transistor Q5. The emitter of transistor Q5 is connected to the junction between the resistor R14 and the emitter of transistor Q4, i.e., the emitters of transistors Q4 and Q5 are connected to −8 volts through a common resistor R14. The collector of transistor Q5 is connected to +4.4 volts D.C. through a resistor R15 and is also connected through a capacitor C9 and resistor R16, to ground.

The point of connection between the capacitor C9 and the resistor R16 is connected through diode D8 to form the output connection of the circuit at point E. Diode D8 is poled to conduct from C9. The emitter of transistor Q5 is also connected to ground through germanium diodes D4 and D5 in parallel. The diodes D4 and D5 are poled in opposite directions.

The operation of the modified Schmitt Trigger, uses the parallel oppositely poled Germanium diodes D4 and D5 to maintain the emitters of transistors Q4 and Q5 at between ±0.2 volts. At time X-X see graph C, the base of transistor Q4 is below the conduction point relative to the emitter. With Q4 therefore nonconducting, Q5 (in accord with its base bias) is conducting, and the output at point D (and see graph) will be nearly 0 volts. As the voltage at the base of Q4 goes positive to the point where conduction in Q4 commences, Q5 is caused to stop conducting. The output voltage D then rapidly goes to the level of the +4.4 volts supply for the collector of Q5, where it remains until the input to the base of Q4 again goes below the cut-off level for Q4 so that Q4 again ceases to conduct and Q5 is switched on, the voltage again returning to substantially its former value of nearly 0 volts. The biasing resistors in the modified Schmitt Trigger circuit are preferably chosen so that whichever of transistors Q4 and Q5 is conducting, it is operating under saturation conditions. The effect of the parallel but opposed diodes D4 and D5 is to ensure that a voltage swing of ±0.2 volts is sufficient to swing the modified Schmitt Trigger from one state to the other. The stages preceding the modified Schmitt Trigger may easily be designed to produce an input to the stage of ±1 volt so that reliable Schmitt Trigger operation is assured. A further advantage of the parallel reverse poled diodes is that they effectively provide an adequate path for current for saturation current to whichever is the 'on' transistor from time to time. As is well known this is desirable in Schmitt Trigger operation.

Point D at the collector of Q5 is connected through capacitor C9 to a differentiating circuit, comprising the capacitor C9 and the resistor R16. This produces from the square wave D, a positive pulse for the rising edge of the square wave and a negative pulse for the falling edge. From the point D is obtained the signal applied on line 'M' to the digital indicator portion of the circuitry. The differentiator output is connected through diode D8 poled to pass only the positive pulse. The output of the diode D8 is shown in graph E.

MONOSTABLE MULTIVIBRATOR

The junction of C9 and R16 is connected through diode D8 to the base of NPN transistor Q6 with the diode poled to conduct toward Q6. A resistor R17 connects the base and emitter of Q6 with the emitter being connected to ground. The collector of Q6 is connected to +12 volts D.C. through resistors R18 and R19, in series. The junction between R18 and R19 is connected through a resistance R20 and then through a zener diode ZD1 to ground. The zener diode ZD1 is poled to provide its design voltage drop when the voltage is higher on the side remote from ground. The junction between R20 and the zener diode ZD1 is connected to the emitter of a PNP transistor Q7 through resistance R21. The collector of transistor Q7 is connected to ground while the base is connected to the junction of R19 and the collector of Q6. The emitter of Q7 is also connected to the base of an NPN transistor Q8 through capacitor C10.

The junction of R20 and ZD1 is connected to the base of Q8 through adjustable resistance R22 and resistance R23, in series and the last mentioned junction is also connected to the collector of Q8 through a resistance R24. The emitter of Q8 is connected to ground. The collector of Q8 is connected to the base of Q6 through a diode D7 poled to conduct toward the base of Q6.

In operation, Q7 acts as temperature compensation for Q8 as hereinafter discussed.

In operation, Q6 and Q7 are normally off and Q8 is normally on. When a positive pulse is received from the junction of C9 and R16 it passes through diode D8 and Q6 is designed to become conducting on the incidence of this pulse. The potential at the base of Q7 falls from 12V to almost 0 volts, turning on Q7, dropping its emitter from 5.8 volts (controlled by zener diode ZD1) to almost 0 volts which in accord with the circuit design turns off Q8 through the capacitor C10. The collector of Q8 and base of Q6 then rise to a voltage determined by the zener diode ZD1 value and the resistances R24 and R17 which results in the continued conduction of Q6 while Q8 is off. The time interval when Q8 is off is dependent on C10 and R22 and R23 and ends when C10 charges to a sufficient amount to render Q8 conducting. Then the drop in voltage at the collector of Q8 causes Q6 to turn off raising Q6 collector to near 12 volts and turning off Q7 and through it Q6. The CR time ( C10 (R 23 + R 22) is a consistant duration following each pulse passing D8 (and of course designed to be less than the closest spacing of such pulses). The resistance R22 is made adjustable to allow control of the duration of the state following the pulse. This may, inter alia, be used for the adjustment for varying wheel diameter. The provision of Q7 operates as temperature compensation for Q8 since if the temperature change causes an increase in the emitter-base drop in Q7 the potential drop at the base of Q8 is lessened by an equivalent amount when it is turned off. This rise in the lowest potential at the base of Q8 corresponds to the rise in the 'turn-on' voltage at the base of Q8 due to the same temperature effect. Lowering temperatures have corresponding effects at Q7 and Q8 and hence the charging time of condenser C10 is, due to the presence of Q7, substantially independent of temperature.

TRANSISTOR SWITCH

The collector of Q6 is connected through a diode D8A, then resistor R25 in series to +12 volts with the diode being poled to conduct toward the collector of Q6. Resistance R25 is also connected through diode D9 and resistance R26 in series to −12 volts with the diode D9 poled to conduct toward −12 volts. The junction D9 and R26 is connected to the base of an NPN transistor Q9 whose emitter is connected to ground. The collector of Q9 is connected to the collector of a PNP transistor Q10 whose emitter is connected to +12 volts through a resistance R27. The base of transistor Q10 is connected between resistances R28 and R29 which are connected between +12 volts and ground.

In operation, with the collector of Q6 at +12 volts, (Q6 off) the voltage divider formed by R25 and R26 is arranged to maintain Q9 conducting. Q10 is therefore biased on through and acts as a constant current source. With Q9 conducting the current through Q10 goes substantially all through Q9, and the voltage at the collector of Q9 is about 0.07 volts (being the collector-emitter drop across transistor Q9). At the start of the timed interval (see graph F, FIG. 3) the voltage at the collector of Q6 drops to almost ground potential dropping the junction between D8A and D9 to +0.6 volts. The 0.6 volt drop through D9 ensures that Q9 turns off and hence the current through Q10 travels to ground through zener diode ZD2. The voltage at point G therefore rises to a precise and repeatable voltage of nearly 9 volts (the design value of the zener diode ZD2) during the timed interval. At the end of the timed interval, Q6 turns off, its collector rises to +12 volts, and Q9 is turned back on with its collector voltage again falling to 0.07 volts. Thus the output of the transistor switch (graph G) is 0.7 volts except during the timed interval when it is 9 volts. The resultant output at point G is a series of constant area (voltage X duration) pulses of a frequency corresponding to that of the basic cyclically varying signal obtained at the proximity detector.

OUTPUT FILTER

Point G is connected through a two stage RC filter comprising resistance R30 and then capacitor C11 connected in series between point G and ground and resistance R31 and then capacitor C12 connected between the junction of R30 and C11, and ground. The point between C11 and R30 is connected to −12V through resistance R36 to compensate for the fact that the lower signal value at point G is 0.07V rather than 0 volts and to bring the output value of the filter to about 9 volts and 0 volts.

The output of the filter (at point H between R31 and C12) is therefore a substantially direct current of magnitude varying only as the frequency of the constant area signals G and hence as the cyclically varying signal and as the railway vehicle shaft speed with which the proximity detector is associated.

EMITTER FOLLOWER PAIR

Point H is connected to the base of a PNP transistor Q11 whose emitter is connected to +12 volts through a resistor R32 and whose collector is connected to −12 volts through a resistor R34. The output of transistor Q11 is taken at the emitter and applied to the base of NPN transistor Q12 whose collector is connected to +12 volts through resistance R33 and whose emitter is connected to −12 volts through resistance R35. The output of the pair (at the emitter of Q12) is supplied at point J. The purpose of the emitter followers is to give current amplification and the second emitter follower Q12 compensates for the 0.6 volt shaft obtained at the emitter-base of Q11.

ANALOGUE INDICATOR

The emitter voltage and current of Q12 at point J being of magnitude corresponding to the railway vehicle shaft speed is applied to an analogue speed indicator and records through resistance R37. The analogue speed indicator may be of any desired type such as a milliamp meter with appropriate series resistors for scaling.

OVERSPEED DETECTOR AND RELAY DRIVE

The signal at the emitter of transistor Q12 is also connected through the resistor R37A to the base of an NPN transistor Q13.

The collector of Q13 is connected to +12 volts through resistance R42 and the emitter of Q13 is connected to −12 volts through resistance R41. Also connected to −12 volts through the resistance R41 is the emitter of NPN transistor Q14 whose collector is connected to +12 volts. The +12 volts is also connected to R38 and then zener diode ZD3 is series to ground and the connection between R38 and zener diode ZD3 is connected through a fixed resistor R39 and then a variable resistor R40 to ground and the connection between R39 and R40 is connected to the base of Q14. The transistors Q13 and Q14 form a differential amplifier and the values of R38 and R39 and R40 and the zener diode ZD3 are selected so that Q14 is normally conducting when the voltage J is less than the value corresponding to the speed selected as an overspeed value. When the selected speed limit is passed, the circuit parameters are so designed that J rises above the predetermined value to cause conduction in Q13 and as Q13 begins to conduct it reduces conduction in Q14 so that the switch from conduction in Q14 to conduction in Q13 is accelerated. The collector of Q13 is connected to the base of a PNP transistor Q15 whose emitter is connected to +12 volts and whose collector is connected through resistances R43 and R44 in series to −12 volts. The junction between R43 and R44 is connected to the base of transistor Q16 whose emitter is connected to −12 volts and whose collector is connected through R45 to a relay and from there to +12 volts. A diode D10 is placed in parallel with the relay and polarized to conduct toward the +12 volts and is provided to eliminate the effects of voltage transients in the opposite from design polarity through the relay. The relay contacts are connected to an overspeed relay (not shown) in the locomotive circuit and taken in parallel across the two locomotive leads is resistance R46 and condenser C13 in series, again to eliminate the effect of voltage transients from the locomotive relay circuitry. The relay contacts are shown in the de-energized positions leaving the locomotive relay circuit open. When the relay is energized, the movable contact moves to closed position to close the locomotive relay circuit and to give whatever indication and corrective operation for overspeed is desired.

In operation, with Q13 off, the base of Q15 is at +12 volts, Q15 is off as is Q16 and the relay is de-energized.

When the voltage at J rises to a value corresponding to overspeed of the vehicle, Q13 becomes conducting and the drop at the base of Q15 turns it on which in turn turns on Q16. The resultant current flow through the relay energizes it to provide the overspeed indication. When the speed of the vehicle drops below the overspeed value, Q13 stops conducting, Q14 again conducts and the relay is de-energized.

SPEED RANGE DETECTING AND NEON LIGHT DECIMAL DRIVE CIRCUIT

Point J is connected through resistance R60 to the base of an NPN transistor Q17 whose collector is connected to −12 volts and whose emitter is connected to the emitter of NPN transistor Q18, the two transistors forming a differential amplifier with the joined emitters being connected to −12 volts through a resistance R47. The collector of Q18 is connected to +12 volts through a resistance R48. The collector of Q18 is connected to the base of a PNP transistor Q19 whose emitter is connected to +12 volts and whose collector is connected through resistances R49 and R50 in series to +12 volts with the junction between R49 and R50 connected to the base of transistor Q18 and to ground through a resistance R51. It will be seen that the resistances R51 and R50 form a voltage divider between +12 volts and ground to affect the bias on Q18 in the manner described hereafter. The collector of Q19 is connected to ground through a resistance R52 and is also connected to ground through resistances R53 and R54 in series with the junction between R53 and R54 being tapped to supply the voltage K discussed hereafter. The collector of Q19 is connected through a resistance R55 to the base of an NPN transistor Q20 and through a resistance R56 to the base of an NPN transistor Q21. The emitter of Q20 is connected to ground and its collector is connected to +4.4 volts through resistance R59 and the collector is also tapped to provide the output L to be discussed hereafter. The emitter of NPN transistor Q21 is connected to ground and its collector is connected through neon light N1 and then R57, in series, to +170 volts with a resistance R61 in parallel with neon light N1. The collector of Q21 is connected through R58 and neon light N2, in series, to ground.

The circuitry described above, incorporates control of: range changing, and control of decimal point indication. In describing the operation of this circuitry it should be assumed pending discussion of FIG. 8 that it is desirable to change the range from increments of tenths of a mile per hour below about 20 miles per hour, to increments of miles per hour above about 20 miles per hour (with a preferred overlap in the ranges, as hereinafter discussed). In describing the operation, let it first be assumed that the value J is at a speed corresponding to the lower range, say in the vicinity of 15 miles per hour. The differential amplifier comprising Q17 and Q18 and its associated biasing, will then be designed so that, Q17 will then be off and Q18 will be biased on by the voltage divider between +12 volts and ground formed by R50 and R51. Since Q18 is on, the drop across R48 causes Q19 to be on also and Q19 therefore provides additional current and thus a slightly greater potential than otherwise for the base of Q18. With Q19 on, output K between R53 and R54 is designed to be at 4.4 volts and Q20 is biased on placing L at substantially zero potential. Further Q21 is biased on putting its collector at substantially ground potential and ensuring that N2 is off and N1 is on.

When the voltage at J indicates a speed at which it is desired to use the higher unit range, then J will be designed to exceed the voltage at the base of Q18, Q17 will turn on, and the rise in voltage across R47 rises to turn Q18 off, with Q18 turned off, Q19 is turned off by the rise in voltage at its base, and the drop in voltage, at the collector of Q19 is designed to be sufficient to turn off Q20 and further is designed to produce a voltage output K which is substantially zero. At the same time Q21 is turned off by the fall in the voltage at the collector of Q19. When Q20 turns off the voltage at L goes from zero to 4.4 volts and when Q21 turns off the resultant rise in the voltage at its collector turns on lamp N2 and turns off lamp N1. As will be seen in discussion of the circuitry of FIG. 7, the lamp N1 when lit provides a decimal point indicating that the increments in the digital speed indication are tenths of a mile per hour, and the lamp N2 when lit provides a decimal point indicating that the increments are miles per hour. One feature of the differential amplifier is the hysteresis effect. In the lower speed range, with the voltage at J at a level where Q17 is off and Q18 is on, the current (and thus voltage potential) for the base of Q18 is obtained from two sources (1) through R50 and (2) through R49 and Q19.

When the maximum of the speed range (for a rising speed as hereinafter explained) is reached, J voltage rises to turn Q17 on and Q18 off which turns off Q19. This removes the Q19 current supply to the base of Q18, reducing the base voltage (and assuring that Q18 turns off fully). Since the potential at Q18 base has been lowered, it will not conduct again until the voltage at J falls to a value lower than that at which Q18 stopped conducting. Thus the switching of Q18 off takes place at a higher speed value (here selected at 20 m.p.h.), for a rising speed than the switching of Q18 on (here selected at 15 m.p.h.) for a falling speed. The result (as hereinafter explained) is to reduce range switching in the digital indicator for speeds hovering in the vicinity of the range switching value, resulting in much easier reading of the digital indicator.

DIGITAL SPEEDOMETER

In FIG. 7 is shown means for providing a digital indication of the railway vehicle speed, such means being operated by the pulses M obtained as shown in FIG. 2 and graph D.

The elements of FIG. 3 are all well known to those skilled in the art and hence are shown in block form only.

Four decade counters C1, C2, C3, C4 are connected in ascending cascade so that pulses are fed to C1 and (under normal connection) when C1 is switching from 9 to 0 a pulse is sent from the C1 'carry' terminal to the input of C2 — and so on, a counter of lower order supplying a single input pulse to the counter of next higher order when changing its state from 9 to 0. The counters are of the type to be reset to 0 by a reset pulse at the respective counter reset terminal.

The counters may be of any desired type. For example I have used the four of the 'TYPE SN749ON DECADE COUNTER' produced by Texas Instruments Incorporated, Semiconductor-Components Division, Post Office Box 5012, Dallas 22, Tex.

Three latching or storage circuits ('latching circuits' hereafter) LS2, LS3 and LS4 are provided, each connected to the respective correspondingly numbered counter. Each of the latching circuits is, in accord with means well known to those skilled in the art, connected to receive a 'strobe' or actuating pulse and thereupon to interrogate and register the count in the counter to which it is connected. Several types of such circuits are available, but I prefer to use the 'TYPE SN7475N Quadruple Bistable Latch' manufactured by Texas Instruments Incorporated. The latching circuit referred to above and the counters previously referred to, both utilize binary coded decimals.

The output of each latching circuit is decoded in a decoder to drive an indicator of the number encoded in the latching circuit. In a preferred embodiment of the invention the output of each latching circuit is connected to a 'Binary coded decimal-to-decimal decoder driver' of the 'TYPE SN744IN BCD-to-DECIMAL DECODER/DRIVER' manufactured by Texas Instruments Incorporated; and each designed, in response to the binary coded decimal input, to actuate one of ten decimal digital representations.

These decoder driver circuits are indicated as decoder driver blocks DD2, DD3 and DD4 which are respectively connected to the correspondingly numbered latching circuits. To provide a decimal indication I find (for example) a display tube known as the 'Nixie tube' manufactured by Burroughs Corporation, Plainfield, N.J. 07061 particularly suitable, and one of these tubes is connected to each decoder driver circuit to indicate numerically which of its ten inputs is actuated and hence to indicate the decimal state of the latching circuit to which the decoder-driver is connected.

The connections between the counter and latches, between the latches and the decoder-driver and between the decoder-driver and the indicator are shown as single wires. However, it will be realized that such single wires represent the number of leads required. The binary coded decimal elements will customarily be connected by four leads while the driver will be connected to the 'Nixie tube' by ten leads. The 'M' input is connected to the input of counter C1 and is connectible by an electronic gate G1 to the input of counter C2. An electric gate G2 is connected to switch in the 'carry' line between the 'carry' output of counter C1 and the input of counter C2. These gates G1 and G2 are respectively provided with a control input CG1 connected to receive the input K, and CG2 connected to receive the input L. The gates may be of any type well known to those skilled in the art and are designed to operate as follows:

When signal K is 4.4 volts G1 provides a conducting path for pulses M to the input of counter C2 and when signal K is zero G1 presents an open circuit and prevents the application of pulses M to counter C2. Likewise G2 provides a conducting path between the 'carry' output of counter C1 and the input of counter C2 when L is at 4.4 volts and G2 prevents conduction between C1 and C2 when L is at 0 volts. As will be seen from an examination of the production of outputs K and L these are always opposite so that when one is at 4.4 volts the other is at 0 volts. Thus when signal K is +4.4 volts and L is 0, gate G1 is open to carry the input pulses directly to the input of counter C2 while G2 is closed, preventing the supply of 'carry' pulses from C1 to C2, and thus effectively shorting out the counter C1 and, during this state of the gates, making C2 effectively the lowest order decade counter.

A clock is provided which can be of any type well known to those skilled in the art, designed to send out alternative 'strobe' and 'reset' pulses on lines CL1 and CL2 respectively. The strobe pulse is applied to the latching circuits LS2, LS3 and LS4 and, in accord with the design of such circuits, is designed to cause the latching circuit to interrogate its corresponding counter and to record the then binary coded decimal state of 'count' of such counter. The reset pulse follows the strobe pulse by just sufficient time to allow the interrogation and recording to be performed and is then applied to the counters C1, C2, C3 and C4 to reset them to a zero value.

The reset pulses are spaced by an amount to give the counters a 'count' numerically corresponding to the speed of the railway vehicle, ignoring the decimal point. For example, let it be assumed that the speed is to be measured in miles per hour and that the number of gear teeth on the proximity detector is such as to produce 880 pulses per second at 100 miles per hour. To normalize the pulse count the clock will cycle and hence emit a reset pulse every 1.13 seconds. The result will be that at 100 miles per hour 1000 pulses will be counted by the lowest order decade counter between reset pulses (the reset pulses will be made short enough, say about 5$\mu$ seconds, that the effect of a pulse on line M overlapping with a reset pulse may be neglected) and at 10 miles per hour 100 pulses per second will be received. The digital indicator will be designed to indicate a range change at a predetermined level (selected as 15–20 miles per hour) so that up to about 20 miles per hour the three indicators 14, 13, 12 will indicate in tenths of a mile per hour, and above about 20 m.p.h. (for rising speeds) the three indicators will indicate in miles per hour. The indicators are shown indicating 19.2 miles per hour which will be seen to result from 192 pulses being supplied to counter C2 between reset pulses.

In operation, therefore, at 10 miles per hour the voltage J will by design, be less than the base voltage of Q18, signal K will be 4.4 volts, signal L will be 0 volts and light N1 will be on (as indicated in FIG. 7) indicating that the right hand digit and the increment of the display is a tenth of a mile per hour. The 100 pulses occurring between counter resets are applied to counter C2 and C1 is bypassed, resulting in a displayed speed of 10.0 miles per hour. When the speed of the vehicle increases to the design range change value of 20 miles per hour, the signal at J exceeds the base value at Q18 and the switching off of Q18 results in: signal K going to 0 volts; L going to 4.4 volts and N1 switching off and N2 switches on. After an increase to 20 miles per hour, therefore, gate G2 allows conduction, gate G1 prevents conduction and the pulses are applied to counter C1. The 200 pulses applied between reset pulses produce on the display an indication of '020.' miles per hour since N1 is off and N2 is on. (If desired, logical means may be added to the display indicators to prevent the lighting of any zero when there is no other digit to its left, in which case the indication here would be '20.' miles per hour). The pulses will be fed to the counter C1 causing an indication in miles per hour until the speed falls below the design level for switching the range indication to tenths of a mile per hour taking into account the hysteresis effect at transistors Q17 and Q18. Assuming that the design was for switching from miles per hour to tenths thereof at decreasing speeds of 15 miles per hour, (for increasing speeds the opposite change was designed to occur at 20 miles per hour) then at 15 miles per hour the voltage at J would decrease to a value at which Q17 turns off and Q18 turns on
switching off N2
switching on N1
preventing conduction through gate G2
allowing conduction through gate G1.

From the previous operation, and since Q19 turns on with Q18, it will be seen that Q17 cannot turn on until 20 miles per hour is again reached.

Whereby at 15 miles per hour the 150 pulses between reset pulses are applied to counter C2 and the indication will be '15.0'.

The advantage of the hysteresis effect on reading will be obvious with speeds near the range switching point. Examples of such speeds in the form they would appear with the inventive design and with and without the hysteresis effect are:

| With 'hysteresis' effect (switching for increasing speeds at 20 m.p.h. and for decreasing speeds at 15 m.p.h. | Without (switching at 20 m.p.h. for speed change in either sense) |
| --- | --- |
| 14.9 | 14.9 |
| 16.1 | 16.1 |
| 17.8 | 17.8 |
| 19.3 | 19.3 |
| 21 | 21 |
| 20 | 20 |
| 20 | 20 |
| 19 | 19.7 |
| 20 | 20 |
| 19 | 19.8 |
| 20 | 20.6 |
| 19 | 19.9 |
| 20 | 20 |

It will be readily seen that the right hand table, although slightly more accurate would be much more difficult to read with the constant range changes.

The D.C. voltages required to power the electronic circuitry may be provided in any desired manner in accord with any one of a number of techniques well known to those skilled in the art.

The application herein describes circuitry and a method of producing both an analogue and a digital indication. However, it is considered within the scope of the disclosure and claims that either one of these indications might be provided without the other.

For use as an analogue speedometer the following circuitry of FIGS. 1 and 2 would be used: the low pass filter 30, emitter follower 40, input amplifier 50, modified Schmidt Trigger Differentiator 60, monostable multivibrator 80, transistor switch 90, output filter 100, emitter follower 110 and analogue indicator 120, with the optional addition of the overspeed detector. The power supply (FIG. 2) could be modified since there would be no need for the 170 volt, 60 volt and 4.4 volt pulses.

For use as a digital speedometer without range changing the above elements could be used from element 30 to element 60 together with the circuitry of FIG. 7 simplified to eliminate the range changing.

For use as a digital speedometer with range changing all the circuitry shown in FIGS. 1, 2 and 7 would be used except that no analogue speed recorded would be connected and the overspeed detector would be considered optional.

The element values and voltages suggested herein are exemplary only and to assist in achieving suggested specific values and indications. It will be realized that these values and voltages may be changed to meet specific design requirements within the scope of the results and advantages set out in the application, and that the scope of the patent is to be limited only as set out in the claims.

I claim:

1. A method of digitally indicating the speed of a railway vehicle comprising producing a cyclically varying signal having a frequency varying with the rotational speed of an axle of said railway vehicle; deriving a further signal from said cyclically varying signal of a frequency proportional to the frequency of said cyclically varying signal; counting the cycles of said further signal during each of a series of substantially equal time intervals of a predetermined length; and displaying the results of the count reached during a said interval to provide an indication of railway vehicle speed; said counting step being performed using a plurality of cascaded decade counters for counting in an ascending order during a said interval and being reset at the end of a said interval, said displaying step including displaying as a decimal number the count reached by said counting means at the end of a said interval, said interval being such that the count reached by said counting means at the end of said interval corresponds to the speed of the railway vehicle apart from the location of a decimal point, said method further comprising continually determining, during each said indication, the magnitude of a signal proportional to said rate of rotation, and displaying said indication, responsive to the magnitude of said signal being less than a predetermined value, in first units of speed and displaying said indication, responsive to the magnitude of said signal being greater than a second predetermined value different from said first predetermined value, in second units of speed ten times as large as said first units, so that changing between displaying the first units and second units takes place at a different speed than changing between displaying said second units and said first units.

2. A method as claimed in claim 1 wherein said displaying steps includes applying said signal to the lowest decade counter of said plurality of cascaded decaded counters responsive to a determination that the display is to be in second first units and by-passing said decade counter and applying said signal to the next highest counter in said plurality of cascaded counters responsive to a determination that said display is to be in said first units.

3. A method as claimed in claim 1 wherein said determination of said signal of magnitude proportional to the rate of rotation of said vehicle shaft is performed during a said interval and wherein said display is switched between displaying said first units to displaying said second units responsive to said signal magnitude exceeding said first predetermined value and said display is switched from displaying said second units to displaying said first units responsive to said magnitude being less than said second predetermined value.

4. An apparatus for providing a digital indication of railway vehicle speed, comprising: means responsive to the rate of rotation of a railway vehicle axis for producing a cyclically varying signal having a frequency proportional to the rotational speed of said axle; means responsive to said cyclically varying signal for producing a further signal of a frequency varying in accordance with the variation of said cyclically varying signal; counting means for counting the number of cycles of said further signal; means for applying said further signal to said counting means during each of a series of substantially equal time intervals of a predetermined length; and means, responsive to the count reached by said counting means during a said interval, for providing an indication of the speed of said railway vehicle; said counting means comprising a plurality of decade counters for counting in an ascending order during a said interval, said counters being reset at the end of each said interval and means for displaying, as a decimal number, the count reached by said decade counters at the end of a said interval; said display means providing an indication of railway vehicle speed either in first units of speed or in second units of speed ten times as large as said first units of speed; said apparatus further comprising speed range detecting means for determining whether said display is to be in said first units or in said second units including means responsive to said further signal for deriving a control signal of a magnitude determined by the frequency of said further signal and control means responsive to the magnitude of said control signal for controlling application of said further signal to said counting means, said control means providing application of said further signal to the lowest decade counter of said plurality of decade counters for a said control signal of a magnitude above a predetermined value so that said display is in said second units and applying said further signal to the next lowest decade counter of said plurality of cascaded decade counters for a said control signal of a magnitude below said predetermined value so that said display is in said first, smaller units, said lowest decade counter being by-passed, said control means being operative during the determination of said railway vehicle speed, and said displaying means including a control switch, said control means including means for controlling said switch to convert said display from said first units to said second units when the magnitude of said control signal exceeds a first predetermined value and for controlling said swtich to convert said display from said second units to said first units when said magnitude is less than a second, lower predetermined value.

5. An apparatus for producing a digital indication of railway vehicle speed comprising means for producing a periodically varying signal of a frequency indicative of the rate of rotation of a railway vehicle drive shaft; a counter for counting the cycles of said signal; means for applying said signal to said counting means during each of a series of substantially equal time intervals of a predetermined length; and means, responsive to the count reached by said counting means during a said interval, for providing an indication of railway vehicle speed; said counting means comprising a plurality of decade counters for counting in an ascending order during a said interval, said counters being reset at the end of each said interval, and means for displaying, as a decimal number, the count reached by said decade counters at the end of said interval; said display means providing an indication of railway vehicle speed either in first units of speed or in second units of speed ten times as large as said first units of speed, said apparatus further comprising speed range detecting means for determining whether said display is to be in said first units or in said second units including means responsive to said signal for deriving a control signal of a magnitude determined by the frequency of said signal and control means responsive to the magnitude of said control signal for controlling application of the first-mentioned signal to said counting means, said control means providing application of said first-mentioned signal to the lowest decade counter of said plurality of decade counters for a said frequency above a predetermined value so that said display is in said second units and by-passing said lowest decade counter and applying said first-mentioned signal to the next lowest decade counter of said plurality of cascaded decade counters for a said frequency below a predetermined value so that said display is in said first, smaller units, said control means being active during the determination of the speed of said railway vehicle, and said display means including a switch controlled by said control means in accordance with the magnitude of said control signal, said switch being switched from a position where said first units are displayed to a position where said second units are displayed where the magnitude of said control signal exceeds a first predetermined value and switched from a position wherein said first units are displayed from a position wherein said second units are displayed where said magnitude is less than a predetermined, lower value.

* * * * *